(12) United States Patent
Zhang

(10) Patent No.: US 11,296,999 B2
(45) Date of Patent: Apr. 5, 2022

(54) SLIDING WINDOW BASED NON-BUSY LOOPING MODE IN CLOUD COMPUTING

(71) Applicant: Telefonaktiebolaget LM Ericsson (publ), Stockholm (SE)

(72) Inventor: Jiangtao Zhang, Pleasanton, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 100 days.

(21) Appl. No.: 16/019,471

(22) Filed: Jun. 26, 2018

(65) Prior Publication Data

US 2019/0394142 A1    Dec. 26, 2019

(51) Int. Cl.
*H04L 12/911* (2013.01)
*H04L 29/08* (2006.01)
*H04L 47/70* (2022.01)
*H04L 67/10* (2022.01)

(52) U.S. Cl.
CPC .............. *H04L 47/70* (2013.01); *H04L 67/10* (2013.01)

(58) Field of Classification Search
CPC ................................ H04L 47/70; H04L 67/10
See application file for complete search history.

(56) References Cited

U.S. PATENT DOCUMENTS

| | | | | |
|---|---|---|---|---|
| 5,574,912 A * | 11/1996 | Hu | .................. | G06F 21/556 712/220 |
| 6,381,243 B1 * | 4/2002 | Ekstedt | .............. | H04Q 11/0478 370/395.62 |
| 6,845,352 B1 * | 1/2005 | Wang | .................. | H04L 41/5009 702/182 |
| 7,093,250 B1 * | 8/2006 | Rector | .................. | G06F 9/4881 718/100 |
| 7,562,369 B1 * | 7/2009 | Salamone | ................ | G06F 9/54 719/328 |
| 8,274,996 B1 * | 9/2012 | Yuan | ..................... | H04L 1/0089 370/473 |
| 10,026,045 B1 * | 7/2018 | Portnoy | ................ | G06Q 10/06 |
| 2002/0041637 A1 * | 4/2002 | Smart | ................ | H04L 27/2602 375/316 |
| 2003/0026201 A1 * | 2/2003 | Arnesen | ............. | H04L 27/2653 370/210 |
| 2003/0167270 A1 * | 9/2003 | Werme | ................ | G06F 11/3466 |
| 2006/0025950 A1 * | 2/2006 | Childress | ............ | G06F 11/3409 702/92 |

(Continued)

FOREIGN PATENT DOCUMENTS

WO    WO-2017031988 A1 *    3/2017 ............ H04L 41/00

*Primary Examiner* — John M Macilwinen
*Assistant Examiner* — Monishwar Mohan
(74) *Attorney, Agent, or Firm* — Christopher & Weisberg, P.A.

(57) ABSTRACT

A method is implemented in a computing system for managing resources to decrease busy-looping, the method using a sliding window template including at least a first sliding window. The method includes initializing the sliding window template for a monitored resource, determining a current status of the monitored resource, updating the first sliding window with the current status, determining a first sliding window status based on whether a first sliding window threshold is met, and determining whether to sleep the monitored resource based on a decision-making table that uses at least the first sliding window status as input.

20 Claims, 6 Drawing Sheets

(56) References Cited

U.S. PATENT DOCUMENTS

| | | | |
|---|---|---|---|
| 2009/0201843 A1* | 8/2009 | Wang | H04W 52/0216 370/311 |
| 2011/0126037 A1* | 5/2011 | Jin | H04W 52/0225 713/323 |
| 2011/0219208 A1* | 9/2011 | Asaad | G06F 12/0862 712/12 |
| 2012/0179924 A1* | 7/2012 | Sugiyama | G06F 1/32 713/320 |
| 2014/0098694 A1* | 4/2014 | Damji | H04W 52/0229 370/252 |
| 2014/0122834 A1* | 5/2014 | Ganguli | G06F 11/3433 712/30 |
| 2014/0254368 A1* | 9/2014 | Zhang | H04L 47/6275 370/235 |
| 2014/0258787 A1* | 9/2014 | Edrich | G06F 11/0706 714/47.2 |
| 2015/0039764 A1* | 2/2015 | Beloglazov | H04L 47/70 709/226 |
| 2015/0052205 A1* | 2/2015 | Svoboda | H04L 67/1097 709/206 |
| 2016/0011648 A1* | 1/2016 | Zhang | H04L 43/065 713/323 |
| 2017/0161478 A1* | 6/2017 | Stavrou | G06F 21/316 |
| 2017/0273058 A1* | 9/2017 | Agiwal | H04B 7/0617 |
| 2019/0102216 A1* | 4/2019 | Mathur | G06F 9/4887 |
| 2019/0213099 A1* | 7/2019 | Schmidt | G06F 9/5083 |
| 2019/0258251 A1* | 8/2019 | Ditty | G06K 9/00805 |
| 2019/0317829 A1* | 10/2019 | Brown | G06F 9/5077 |

* cited by examiner

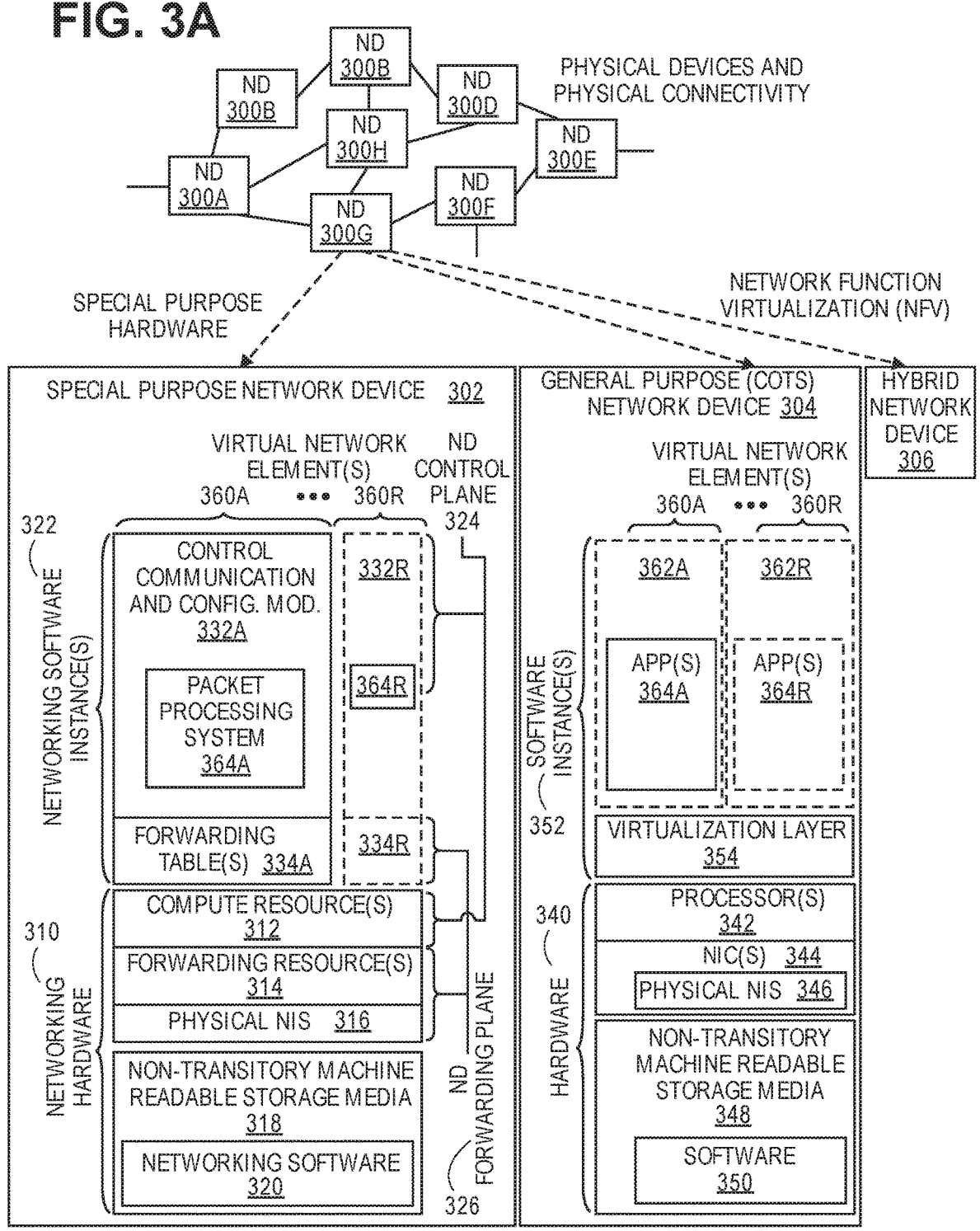

SLIDING WINDOW BASED NON-BUSY LOOPING MODE IN CLOUD COMPUTING

TECHNICAL FIELD

Embodiments of the invention relate to the field of packet processing management in network functions and devices; and more specifically, to providing a sliding window based non-busy looping mode for implementing packet processing management in a network device or virtualized network device executing in a cloud computing environment.

BACKGROUND ART

Network device process data packets that are received and/or transmitted over network connections. Packets are placed in queues or similar storage structures as they wait to be processed by the central processing unit (CPU) or similar processing unit. A packet processing system determines when there are packets in the queue to be processed by the CPU. The packet processing system uses a busy polling and looping mechanism in order to detect when there are packets in the queue to be processed. A thread is tasked to continually check for data packets that are available to be processed. This is referred to as thread busy looping. By repeatedly checking for packets to be processed the packet processing system can ensure the CPU immediately processes the packets on arrival and avoids lag in the processing of the packets, thereby achieving a high level of packet processing performance in terms of throughput and latency. The packet processing system can be implemented in a network device or deployed in a cloud system, for example where network function virtualization is utilized.

In cases where the packet processing system is deployed in a cloud computing environment, the cloud computing environment may bill an owner of the packet processing system based on the CPU usage or energy usage in the cloud computing environment. Thread busy looping is not energy efficient when the packet processing system load is low or in an idle state, especially when these systems are deployed into a data center or cloud computing environment where charging is based on resource usage.

Therefore, the owner of the packet processing system has a business interest to reduce costs by reducing the CPU utilization when the packet processing system is not running in its full capacity (i.e., when there aren't packets to be processed or there is a low rate of data packets to be processed). The owner of the packet processing system, on the other hand, doesn't want to reduce the throughput performance and latency. Packet processing systems can include the Ericsson Virtual Router (EVR), virtual Evolved Packet Gateway (vEPG), virtual Wi-Fi Mobility Gateway (vWMG), and virtual Broadband Network Gateway (vBNG). These packet processing systems use thread level or process level busy looping to poll for packets to be processed either after receiving or for transmitting.

SUMMARY

In one embodiment, a method is implemented in a computing system for managing resources to decrease busy-looping, the method using a sliding window template including at least a first sliding window. The method includes initializing the sliding window template for a monitored resource, determining a current status of the monitored resource, updating the first sliding window with the current status, determining a first sliding window status based on whether a first sliding window threshold is met, and determining whether to sleep the monitored resource based on a decision-making table that uses at least the first sliding window status as input.

In another embodiment, a network device executes the method for manage resources usage to decrease busy-looping. The method uses a sliding window template including at least a first sliding window. The network device includes a non-transitory machine-readable medium having stored therein a packet processing system with a non-busy looping mode, and a processor coupled to the non-transitory machine-readable medium. The processor executes the packet processing system. The packet processing system initializes the sliding window template for a monitored resource, to determine a current status of the monitored resource, updates the first sliding window with the current status, determines a first sliding window status based on whether a first sliding window threshold is met, and determines whether to sleep the monitored resource based on a decision-making table that uses at least the first sliding window status as input.

In a further embodiment, a computing device implements a plurality of virtual machines for implementing network function virtualization (NFV), where a virtual machine from the plurality of virtual machines is configured to execute the method to manage resources usage to decrease busy-looping. The method uses a sliding window template including at least a first sliding window. The computing device includes a non-transitory machine-readable medium having stored therein the packet processing system with a non-busy looping mode, and a processor coupled to the non-transitory machine-readable medium. The processor executes the virtual machine. The virtual machine executes the packet processing system. The packet processing system initializes the sliding window template for a monitored resource, determines a current status of the monitored resource, updates the first sliding window with the current status, determines a first sliding window status based on whether a first sliding window threshold is met, and determines whether to sleep the monitored resource based on a decision-making table that uses at least the first sliding window status as input.

In one embodiment, a non-transitory machine-readable medium has stored therein a set of instructions, which when executed by a computing device cause the computing device to perform set of operation of the method to manage resources to decrease busy-looping. The method uses a sliding window template including at least a first sliding window. The set of operations include initializing the sliding window template for a monitored resource, determining a current status of the monitored resource, updating the first sliding window with the current status, determining a first sliding window status based on whether a first sliding window threshold is met, and determining whether to sleep the monitored resource based on a decision-making table that uses at least the first sliding window status as input.

BRIEF DESCRIPTION OF THE DRAWINGS

The invention may best be understood by referring to the following description and accompanying drawings that are used to illustrate embodiments of the invention. In the drawings:

FIG. 3A illustrates connectivity between network devices (NDs) within an exemplary network, as well as three exemplary implementations of the NDs, according to some embodiments of the invention.

FIG. 3B illustrates an exemplary way to implement a special-purpose network device according to some embodiments of the invention.

DETAILED DESCRIPTION

Figure 1:
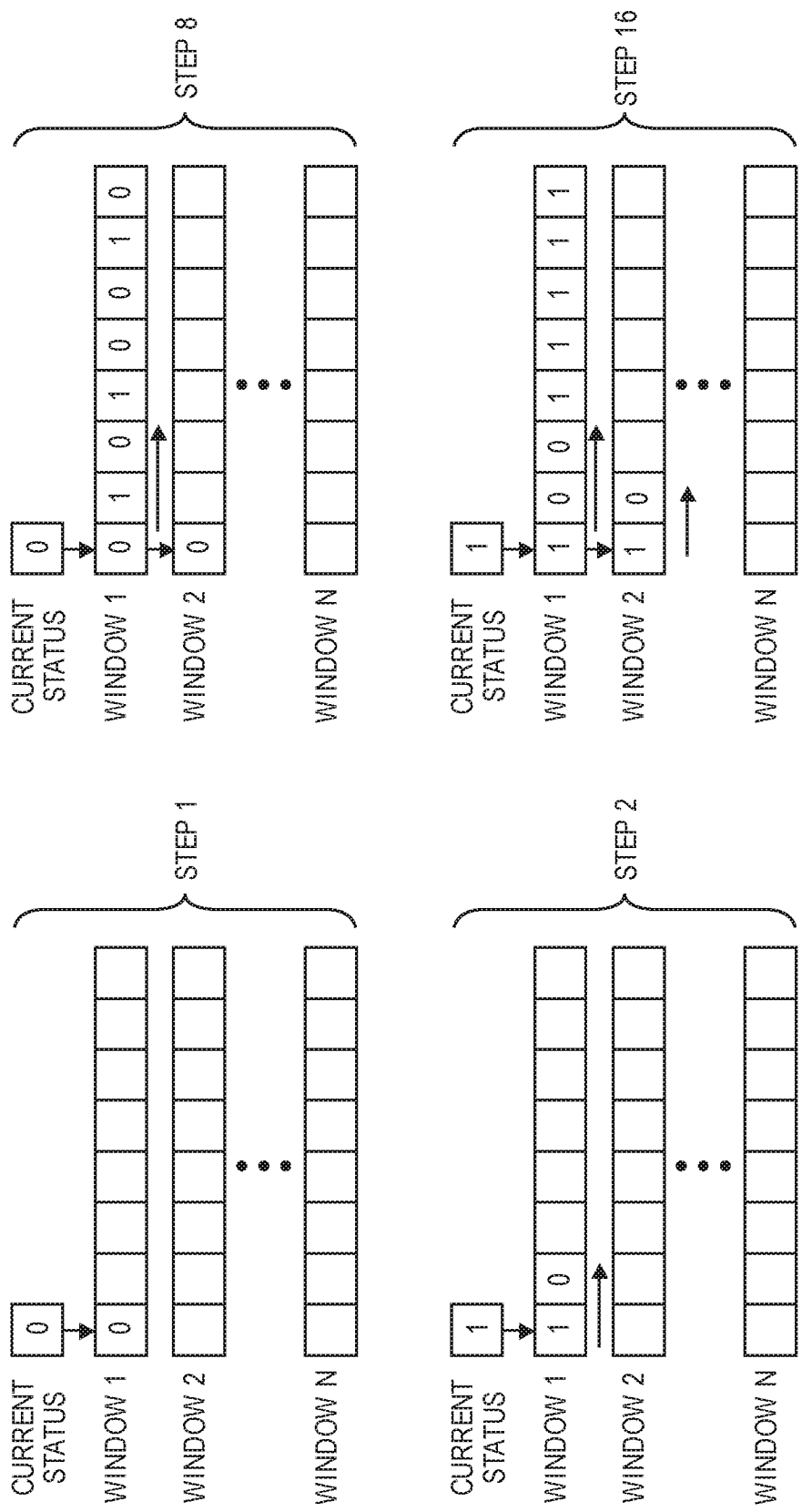
FIG. 1 is an example diagram of one embodiment of a sliding window packet processing scheme.

The following description describes methods and apparatus for managing packet processing. The embodiments provide a process and system for packet processing management in network functions and devices. The embodiments provide packet processing system with a sliding window based non-busy looping mode for implementing packet processing management in a network device or virtualized network device executing in a cloud computing environment. The packet processing system uses a sliding window-based process to dynamically determine when a busy-loop thread can rest for a predetermined amount of time. The rest for the busy-loop thread is identified when the packet processing system is not running at full capacity to minimize performance impact to latency and throughput. Thus, the embodiments seek to align the central processor (CPU) or similar processor usage with periods of full system load.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

The embodiments can be implemented in a network device or as part of a virtual network function. In one embodiment, the virtual network functions are part of a virtual router or similar virtualized environment. For example, the embodiments can be implemented as part of an Ericsson Virtual Router (EVR) platform. The embodiments provide a packet processing system with a non-busy looping mode for use in such virtual platforms. The packet processing system with a non-busy looping mode can be beneficial in virtual platforms such as cloud computing environments where customers are billed based on resource usages, for example central processor unit (CPU) usage or similar processing usage.

Packet processing systems use a busy-looping mode to achieve high performance in terms of low latency and high throughput. However, when the packet processing systems using a busy-looping mode are deployed in a cloud computing environment where billing is based on the resource usage (e.g., CPU usage or energy usage), then the busy-looping mode can incur higher operating costs. Thus, customers of the cloud computing environment that run packet processing systems are impacted by these higher operating costs and would benefit from reducing the resource utilization in the cloud computing environment when the packet processing system is not running at or near its full capacity. Customers running the packet processing systems, however, don't want to reduce their throughput performance or increase their packet processing latency.

Existing packet processing systems including the Ericsson Virtual Router (EVR), virtual Evolved Packet Gateway (vEPG), virtual Wi-Fi Mobility Gateway (vWMG), and virtual Broadband Network Gateway (vBNG) utilize a busy-looping mode for packet processing management. The busy-looping mode provides a high level of performance in terms of throughput and low latency where it polls the queue or similar data storage to determine whether data packets have been received or are ready for transmitting and therefore that additional processing is needed by the CPU or similar processor. The busy-looping mode may have a thread or process dedicated to polling the queue or similar data structure. Busy looping is not resource efficient. Unnecessary energy and CPU cycles are expended when the packet processing system load is low or in idle state, especially when these packet processing systems are deployed into a virtual platform such as a data center or cloud computing environment where charging is based on the resource usage.

Alternatives or modifications of the busy-looping mechanism can be used to lower the resource usage (e.g., reducing CPU usage), but each has significant drawbacks in performance. An interrupt mode can be used where an interrupt is generated to signal that data packets have been enqueued for processing by a packet processing system. However, not all virtual platforms have drivers that support this mode. In addition, the performance of an interrupt mode is low with significant latency and lower throughput. A sleep or idle mode can be utilized where the packet processing system is stopped or held for a pre-determined amount of time or processor cycles. The sleep or idle mode is invoked unconditionally without consideration for the load on the packet processing system. The sleep or idle mode significantly reduces the throughput performance and increases the latency. Mutual exclusion mechanisms such as futex based or pthread condition based semaphores can be used as a wait/wakeup mechanism. These mutex based modes of operation are operating system call based, which limit their scalability. In a cloud computing environment, each deployed virtual router or packet processing system operating as a network function would introduce another thread to be managed. With more and more threads to be managed, the wakeup thread of the operating system will get overloaded by the system calls.

The embodiments overcome these limitations by utilizing a sliding window-based status tracking process to dynamically set a polling thread of the packet processing system to take a short break when the packet processing system is not running at or near its full capacity. Meanwhile, when packet processing system is running at or near its full capacity, the performance can be kept the same as the performance achieved with a busy-looping mode. The embodiments enable the packet processing system resource (e.g., CPU) usage to be aligned with the packet processing system load instead of a consistent higher level of resource usage caused by busy-looping.

The sliding window-based process detects the packet processing system status, i.e., whether the packet processing system is busy processing a packet in the queue or the packet processing system is idle and the queue is empty. In some example embodiments, this packet processing system status can be tracked in an array where the busy status is represented as a 1 bit and the idle status is represented as a 0 bit. In other embodiments, any bit representation or similar tracking mechanism can be utilized. The array can have any size dependent on the range of time or cycles to be tracked. In one example embodiment, the array is a bit array of 32 or 64 bits in an unsigned integer format.

In some embodiments, the sliding-window based process can utilize different numbers and/or configurations of sliding windows to represent different time ranges and different levels of granularity. A single sliding window can be used or multiple sliding windows. For example, a short-term bit array can be used to represent a short-term busy trend for the packet processing system. A long-term bit array can be used to represent a long-term busy trend for the packet processing system. In an example with two windows, the short-term and long-term windows, correspond with the short-term bit array and the long-term bit array, respectively. The packet processing system repeatedly checks or 'loops' to check for data packets in the queue with a polling thread or process. The packet processing system can use a single thread or process, or multiple threads or processes to perform the check. Each loop of the thread or process can detect the packet processing system status, i.e., whether there is a data packet in the queue and the packet processing process is processing the data packet.

With each iteration of the loop, the sliding window is shifted (e.g., left shifted) to drop the oldest status indicator in the sliding window and make a space for a current status of the packet processing system. For example, the packet processing system can left shift the short-term bit array and store the current status in the least significant bit of the short-term bit array. Further, in this example where 64-bit arrays are utilized, every 64 loops (i.e., checks of the status of the packet processing system), the long-term bit array is left shifted and the entirety of the short-term bit array is analyzed to set a status in the lest significant bit of the long-term bit-array representing the short-term status over 64 loops. In one example implementation, the non-busy looping mode can use popcnt (a hardware accelerated instruction) or similar function to check a number of set bits, e.g., where a bit value of '1' indicates a busy cycle, in the short-term bit array. If the number of '1s' is equal to or greater than a pre-configured short-term threshold, then the update of the status to the least significant bit of long-term busy bit array is also '1' to indicate a busy period.

The status of the packet processing system can be determined by checking for the presence of data packets in the queue. For example, this approach may be utilized where a packet processing system has a single thread for processing data packets. In other embodiments, the packet processing system may process packets from multiple queues. The packet processing system can be assessed as busy when any of the queues includes a data packet. In further embodiments, rather than checking for data packets in the queue, the sliding window process may track tasks or micro-tasks assigned to the packet processing system or a similar assessment of work. Where there are tasks or micro-tasks being performed or assigned to the packet processing system then the packet processing system can be assessed as busy.

The embodiments provide a process for packet processing management, that can take the current, short-term and long-term status of packet processing into consideration as factors to determine when to sleep or continue execution of a polling thread or similar active component of the packet processing system. The embodiments manage CPU usage to be in line with actual system load, which is energy efficient. The embodiments, avoid latency during the transition stage from busy to idle or from idle to busy. The embodiments, flatten the impact of bursts of data packets impact on system performance caused by the packet processing system sleeping the polling thread. The embodiments have a minor impact on the performance of the packet process system. The embodiments can converge quickly and are not performance impacting for existing threads and process. In some embodiments, use of instructions such as popcnt can assist in maintaining high throughput and low latency for the packet processing system.

FIG. 1 is a diagram of one embodiment of an example of the non-busy looping mode for a packet processing system. In this example, there are N windows used to track status of the packet processing system, where N can be any positive integer. The windows provide differing levels of granularity in trend detections from the shortest range in window 1, to a longest range in window 1. The embodiments can be utilized with any positive whole number of windows including one window.

In the embodiments, for each polling thread or execution unit of the packet processing system, there will be a sliding window template created for it. Within the template the following fields may be used: current status (single bit, 0 means idle, 1 means busy); window 1 bit array (e.g., a short-term bit array that is 64 bits unsigned integer, each bit 0 means idle, 1 means busy); window N bit array (e.g., a long-term bit array that is 64 bits unsigned integer, each bit 0 means idle, 1 means busy); a window 1 threshold (an integer which is less than or equal to the number of bits in the window 1 bit array, in this example 64); window N threshold (an integer which is less than or equal to the number of bits in the window N bit array, this example 64); and a decision-making table.

The window thresholds in the thread sliding window template denote that if number of busy bits is more than or equal to the threshold value, then the window is considered to be in busy status, otherwise the window is considered to be idle. The decision-making table is a mapping of the state of the windows to a decision whether to sleep the tracked polling thread or execution unit. For example, a decision-making table can include a simple three bits mapping to the decision, which would be translated to an array with 8 elements. Each element there will be a decision whether to sleep, or continue to run.

Step 1 of the example illustrated in FIG. 1 shows a starting state of the windows of the non-busy loop mode of the packet processing system. In the initial state, the current state is assessed as being non-busy with an assigned value '0.' The current state of the packet processing could be busy, i.e., a value '1,' but the non-busy status is provided by way of example. Similarly, the encoding of busy and non-busy can be with any value. A single bit representation is provided by example and provides efficient storage and processing representation of state.

At the first step 1, the current status is stored in the least significant bit of the window 1 bit array or in a similar location. Window 1 represents the tracking of status with the finest level or granularity or shortest time frame. The rest of the window 1 bit array in this example is empty, however, the window bit arrays 1-N can be initialized to any value. The non-busy loop mode process continues to iterate and check the status of the packet processing system. With each loop, a check is made of the current status of the packet processing system. The value for the current status is stored in the window 1 bit array, which is left shifted. With each left shift of the window 1 bit array, the most significant bit will be discarded and the current status will be put into the least significant bit. Step 2 in the illustrated example of FIG. 1 shows the next iteration with a current status of 'busy' or '1' added to the window 1 bit array. In other embodiments, the current status could be inserted into other equivalent data structures and similarly shifted or manipulated to discard older status data.

In the illustrated example 8-bit arrays are utilized. In other embodiments, 32-bit or 64-bit arrays may be utilized. An 8-bit array is presented for sake of illustration and simplicity. In this example, every 8 loops or checks, the next higher window in the sliding window hierarchy will be left shifted, such that the most significant bit will be discarded and the lower adjacent window status will be calculated based (e.g., using hardware accelerated popcnt operation) and compared with the corresponding window threshold, the final status will be put into the least significant bit of adjacent higher window. This is illustrated in Step 8 of FIG. 1, where the values in window 1 are computed and compared to a threshold of window 1 to determine that window 1 is 'not-busy' and a value '0' is placed in the window 2 bit array. Similarly, window 2 is updated again in Step 16 of FIG. 1.

This process is continuous, where the non-busy looping mode process will collect the current status and update each window 1-N accordingly. Simultaneously, a decision to sleep an associated polling thread or execution unit of the packet processing system is made based on the decision-making table. Example decision making tables are discussed further herein below.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
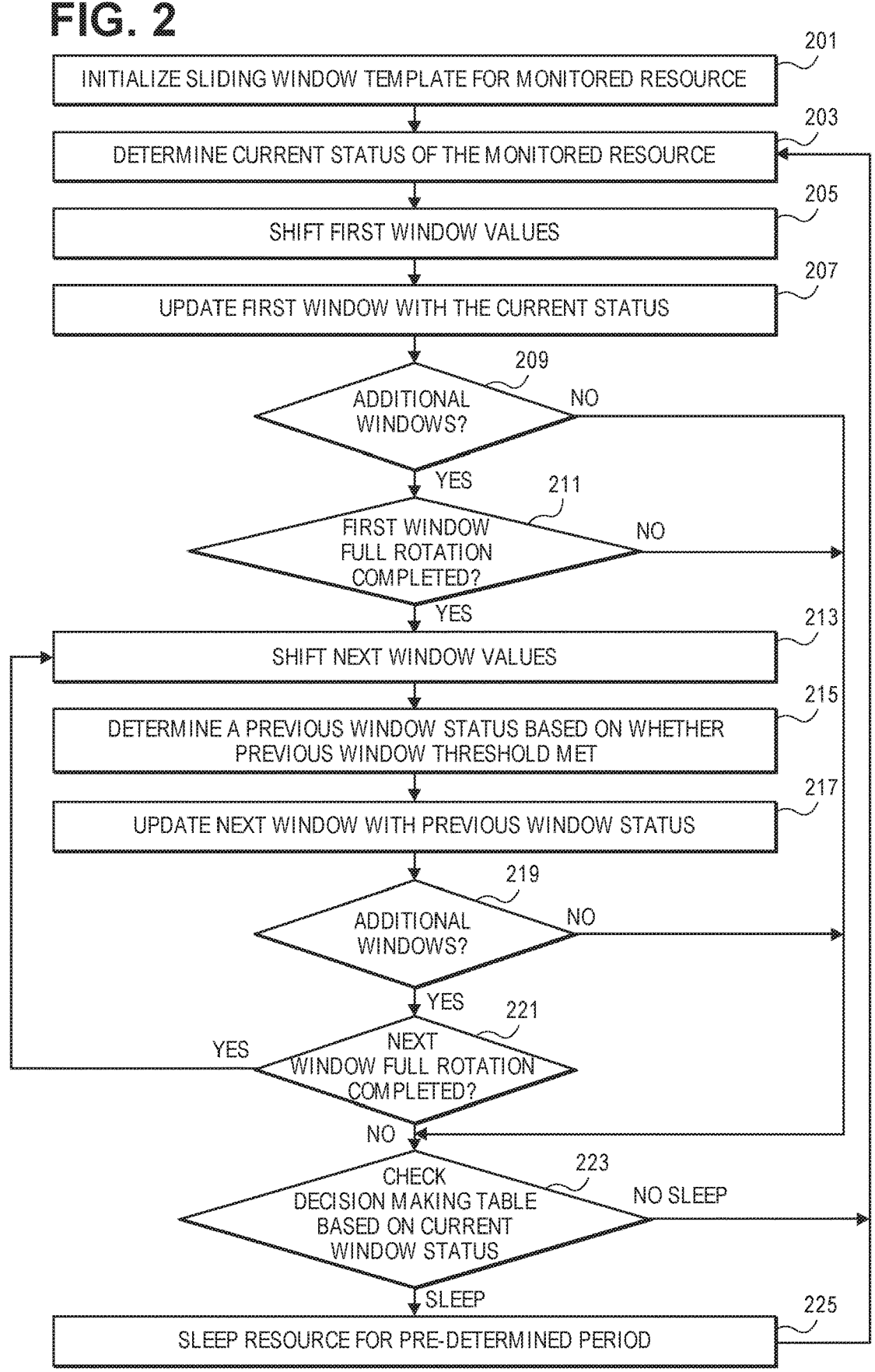
FIG. 2 is a flowchart of one embodiment of the process of a sliding window packet processing scheme.

FIG. 2 is a flowchart of one embodiment of the process of the non-busy looping mode of a packet processing system. The non-busy looping mode process can be initiated whenever a packet processing system is started or utilized in a network device, cloud computing environment or similar operating environment. The process can start by initializing a sliding window template for a packet processing system, a resource of a packet processing system such as an execution unit, or similar resource (Block 201). Each type of resource can have a different type of sliding window template configured for that resource to be monitored. The sliding window template can include any number of sliding windows representing differing levels of granularity to track trends in the activity of the monitored resource. The sliding window template can be initialized by making an instance of the data structure for tracking the resource and initializing the values of the data structure for monitoring. The instance of the sliding window template can include a first sliding window, and a first sliding window threshold.

The process then begins monitoring the associated resource to determine the current status of the resource (Block 203). The current status of the resource can be determined by identifying a presence of a data packet to be processed in a queue or similar data structure, by identifying a task or micro-task assigned to process a data packet or by a similar determination of current status. The first sliding window can be shifted, for example left shifted, to make room for the current status (Block 205). In one example embodiment, where a first sliding window is represented by a first bit array, a most significant bit of the first bit array can be discarded to open a least significant bit of the first bit array. The open spot in the bit array can be used to store the current status of the monitored resource (Block 207). In other embodiments, the shifting of the sliding window can occur before the current status is determined.

After the current status is determined and stored in the first sliding window, a check is made whether there are additional windows that may need to be updated (Block 209). Any number of sliding windows may be defined for monitoring a given resource. If there are additional windows, then the process proceeds to evaluate a next adjacent sliding window in a hierarchy, sequence, or prioritized set of sliding windows from 1 to N sliding windows with each additional sliding window offering a longer time frame and lower level of granularity in tracking a status of the monitored resource. The evaluation of each additional window has a similar process of shifting the window and inserting updated status information as discussed further herein below.

If there are not any additional windows, then the process continues to make a check of the decision-making table (Block 223), as discussed further herein below. The decision-making table determines whether the status of the windows indicates that the resource should be placed in a sleep (i.e., non-active) state or should continue to execute.

If there are additional windows, then a check is made whether a full rotation through the first sliding window has completed (Block 211). A full rotation through the sliding window is a number of iterations correlated with a size of the sliding window. For example, if the first bit array representing the first sliding window is 64 bits then a full rotation is 64 iterations. The timing of each iteration can vary from a clock cycle to any other timing metric or execution slice of the packet processing system in the relevant operating environment. If a complete rotation has not occurred for the first sliding window, then the process continues to make a check of the decision-making table (Block 223), as discussed further herein below.

If a complete loop for the first sliding window has completed, then the process starts to update the next sliding window in the set of available sliding window. The next sliding window is shifted (e.g., left shifted) to discard the oldest status value and open a spot in the corresponding bit array or similar data structure representing the next sliding window (Block 213). A determination can then be made as to a status of the previous sliding window in the sequence or hierarch (Block 215). The status values in the previous sliding window are evaluated and compared to a previous window threshold (Block 215). The status values can be correlated, accumulated, or similarly computed to generate a score for the status values of the previous sliding window. The previous window threshold is defined by the sliding window template for the monitored resource. In this way administrators can determine the conditions of what activity over a given tracked period associated with a sliding window is considered to indicate a busy status or an idle status. Once the status of the previous sliding window is determined, then the status value for the previous sliding window can be stored in the open slot of the next sliding window (Block 217). As used herein a 'previous window' and 'next sliding window' are designating adjacent windows in the sequence or hierarchy.

In one example embodiment, an instruction such as the popcnt hardware instruction or compiler intrinsic instruction is utilized to check how many bits are set in the bit array of the previous sliding window for fast performance in evaluating the status of the previous sliding window. Once the next sliding window is updated with a status value for the previous sliding window, then a check can be made whether there are additional windows to be updated (Block 219). The additional sliding windows relate to all sliding windows above or after the sliding window that is currently being updated. If there are not any additional sliding windows, then the process continues to the decision-making table check (Block 223).

If there are additional windows, then a check is made whether a full and complete rotation of the current/next sliding window has occurred (Block 221). The process of updating each sliding window in sequence or the hierarchy can continue until all of the windows have been updated as needed. If a rotation has been completed for the current/next sliding window (Block 221), then the process continues to update that next sliding window in the sequence or hierarchy after the current sliding window (Block 213).

Once all of the sliding windows have been updated (e.g., after Block 211 or any iteration of Block 221), then the process checks a decision-making table based on the values in each of the sliding windows or any subset of the sliding windows for the monitored resource (Block 223). Example decision-making tables are discussed further herein below. The decision-making tables define a set of actions to be taken for a given set of status values in the available sliding windows. Based on the relevant status values in the set of available sliding windows, a determination to sleep the polling thread or process is made. A 'set,' as used herein, refers to any positive whole number of items including one item being in the set. If the decision-making table indicates no sleep for the monitored resource, then the process continues to update the first sliding window (Block 203). If the decision-making table indicates to sleep the polling thread or process, then the monitored resource is slept or similarly inactivated for a period of time defined by the sliding window template for the resource (Block 225). The period of time can have any length and utilize any metric for tracking the duration, including units of time, clock cycles or similar measurements. After the period of time for sleeping the resource expires, then the process continues to monitor the resource by updating the first sliding window (Block 203).

In other embodiments, the decision-making table can be checked at other intervals either synchronously or asynchronously with the updating of the sliding windows for monitoring the resource. The frequency of the decision-making table check can be defined by the sliding window template for the resource or can be set by the process or administrator, independently.

An example of the non-busy looping mode for a packet processing systems is set forth below as pseudo-code, where in this example two sliding windows are used referred to as a short window and a long window:

```
int
nonbusy_shouldsleep (nonbusy_t hdl, int cur) {
    _nonbusy_t *p = (_nonbusy_t*)hdl;
    uint64_t longw,shortw;
    p->loopcnt++;
    // Every loop, the process updates the short window
    shortw = p->shortw;
    shortw <<= 1;
    shortw |= cur & 0x1;
    p->shortw = shortw;
    // Every 64 loops, the process updates the long window once
    if ((p->loopcnt & 0x3F) == 0) {
        longw = p->longw;
        longw <<= 1;
        longw |= is_busy_w(p->shortw, p->shortw_thrhld);
        p->longw = longw;
    }
    int busy=0;
    if (is_busy_w(p->longw, p->longw_thrhld)) {
        busy = 1 << 2;
    }
    if (is_busy_w(p->shortw, p->shortw_thrhld)) {
        busy |= 1 << 1;
    }
    busy |= cur;
    return (p->sleep_tbl[busy & 0x7]);
}
```

An example of a decision-making table for a non-busy looping mode for a packet processing system is set forth below as flat table, where in this example two sliding windows are used referred to as a short window and a long window. The status of each sliding window is assessed using the corresponding sliding window threshold:

TABLE I

| Current Status | Short-term Status | Long-term Status | Decision |
|---|---|---|---|
| 0 | 0 | 0 | Sleep |
| 1 | 0 | 0 | Continue |
| 1 | 1 | 0 | Continue |
| 1 | 0 | 1 | Continue |
| 1 | 1 | 1 | Continue |
| 0 | 1 | 0 | Continue |
| 0 | 0 | 1 | Sleep |
| 0 | 1 | 1 | Continue |

The decision-making table does not have to be the same for all the monitored resources and can vary for each resource as defined in a corresponding sliding window template. Different resources with different latency and non-busy looping requirements will have different values configured. For example, when current loop status is not busy, the short term busy bit array indicates it is still busy, the long term busy bit array indicates it is not busy, it would be possible to continue to check instead of sleep.

An example of another decision-making table for a non-busy looping mode for a packet processing system is set forth below as flat table, where in this example one sliding window is utilized. The status of the single sliding window is assessed using the corresponding sliding window threshold:

TABLE II

| Current Status | Busy bit array Status | Decision |
|---|---|---|
| 0 | 0 | Sleep |
| 1 | 0 | Continue |
| 1 | 1 | Continue |
| 0 | 1 | Continue |

An example of the non-busy looping mode for a packet processing system is set forth below as pseudo-code, where in this example one sliding windows is used:

```
int
nonbusy_shouldsleep (nonbusy_t hdl, int cur) {
    _nonbusy_t *p = (_nonbusy_t*)hdl;
    uint64_t shortw;
    p->loopcnt++;
    // Every loop, the process updates the busy bit array window
    shortw = p->shortw;
    shortw <<= 1;
    shortw |= cur & 0x1;
    p->shortw = shortw;
    if (is_busy_w(p->shortw, p->shortw_thrhld)) {
        busy |= 1 << 1;
    }
    busy |= cur;
    return (p->sleep_tbl[busy & 0x3]);
}
```

Thus, the embodiments encompass variations using any number of sliding windows for any given monitored resource including variations with one or multiple sliding windows.

Figure 4:
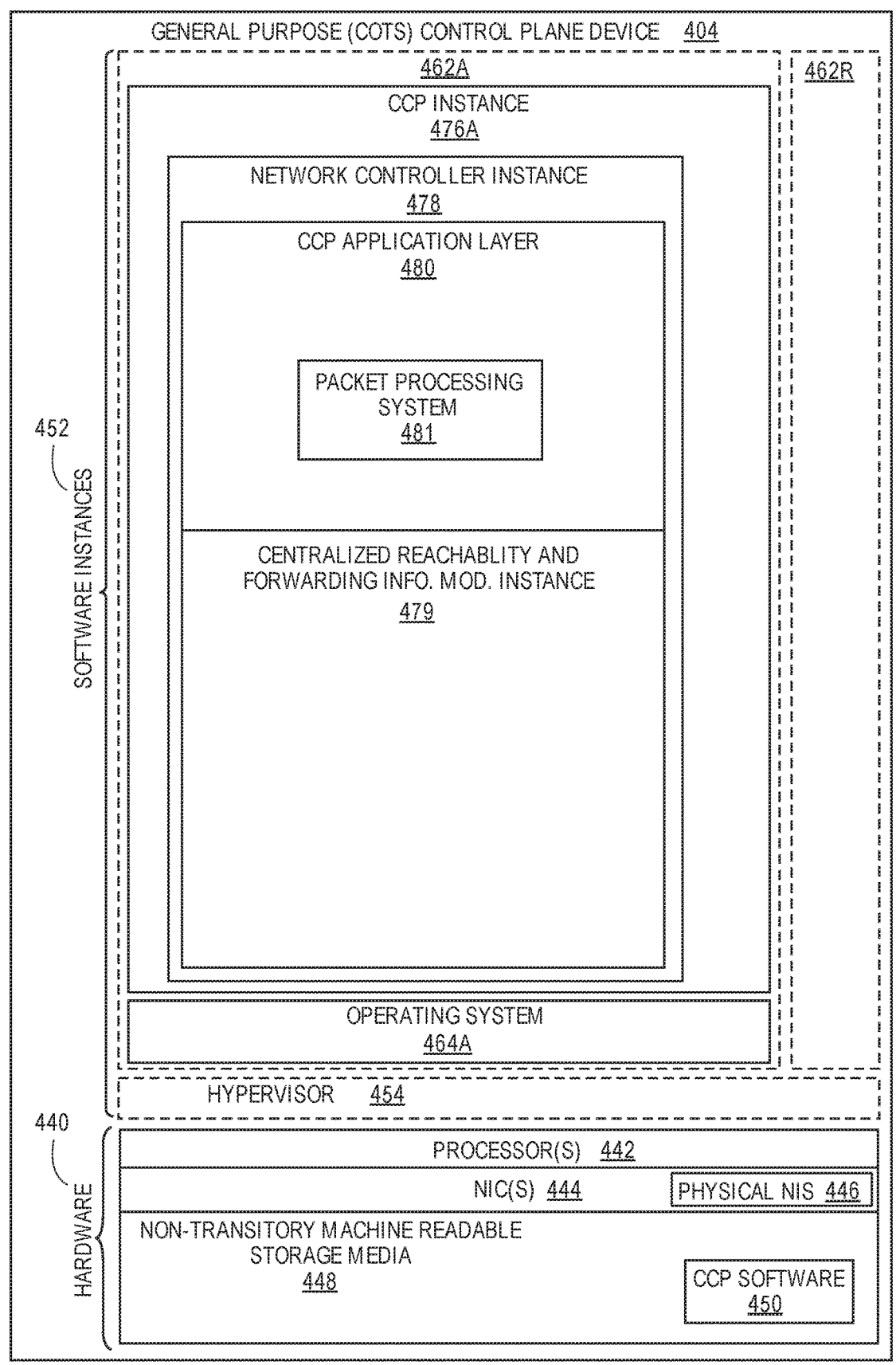
FIG. 4 illustrates a general-purpose control plane device with centralized control plane (CCP) software 450), according to some embodiments of the invention.
Figure 5:
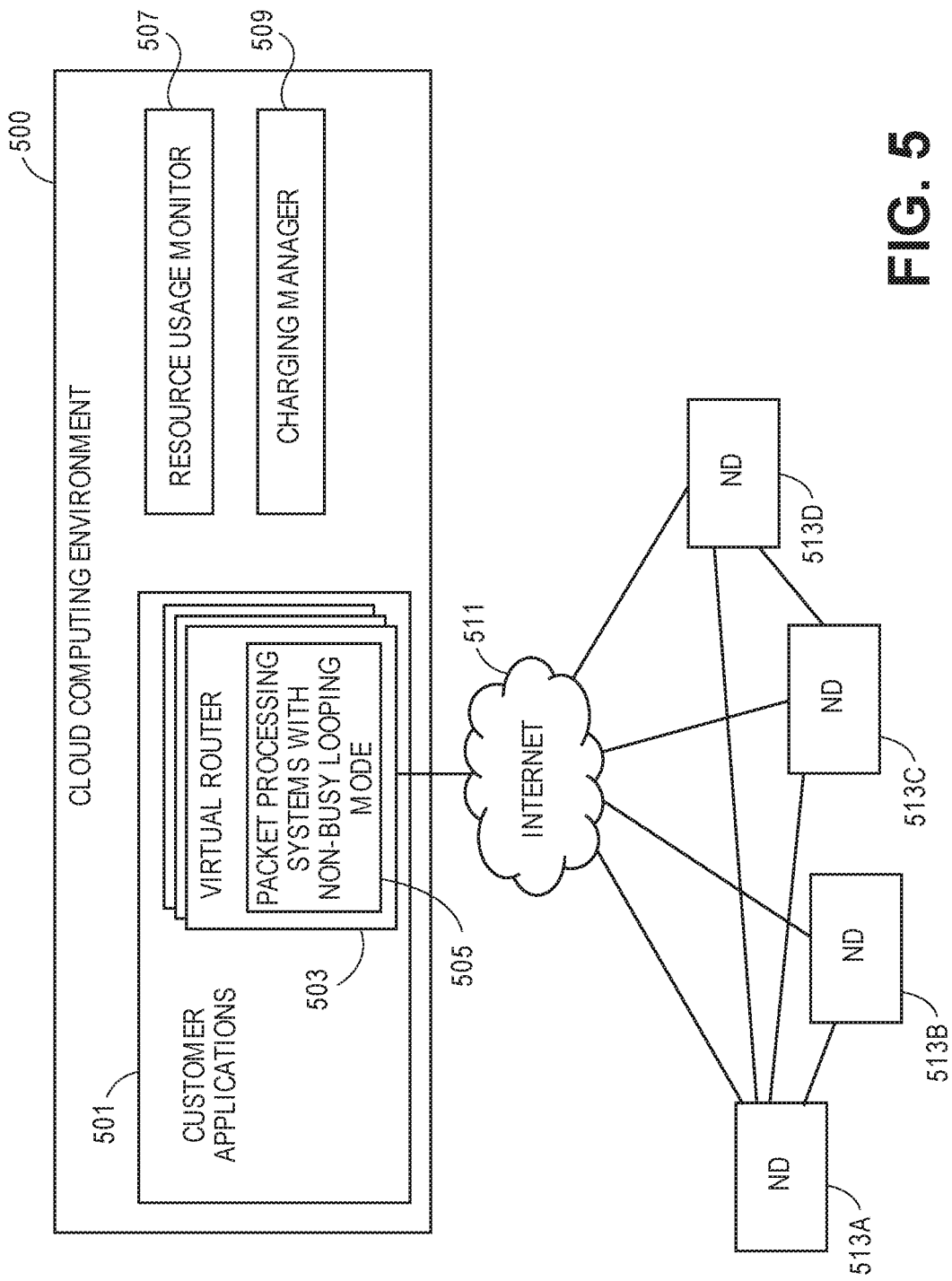
FIG. 5 is a diagram of one example embodiment of non-busy looping mode packet processing system in a cloud computing environment.

The non-busy looping mode for packet processing systems can be implemented in network devices, in a virtualized execution environment (e.g., using network function virtualization), in a could computing environment and similar execution environments. FIGS. 3-5 provide example execution environments and applications for the non-busy looping mode packet processing system, by way of example and not limitation.

FIG. 3A illustrates connectivity between network devices (NDs) within an exemplary network, as well as three exemplary implementations of the NDs, according to some embodiments of the invention. FIG. 3A shows NDs 300A-H, and their connectivity by way of lines between 300A-300B, 300B-300C, 300C-300D, 300D-300E, 300E-300F, 300F-300G, and 300A-300G, as well as between 300H and each of 300A, 300C, 300D, and 300G. These NDs are physical devices, and the connectivity between these NDs can be wireless or wired (often referred to as a link). An additional line extending from NDs 300A, 300E, and 300F illustrates that these NDs act as ingress and egress points for the network (and thus, these NDs are sometimes referred to as edge NDs; while the other NDs may be called core NDs).

Two of the exemplary ND implementations in FIG. 3A are: 1) a special-purpose network device 302 that uses custom application-specific integrated-circuits (ASICs) and a special-purpose operating system (OS); and 2) a general purpose network device 304 that uses common off-the-shelf (COTS) processors and a standard OS.

The special-purpose network device 302 includes networking hardware 310 comprising a set of one or more processor(s) 312, forwarding resource(s) 314 (which typically include one or more ASICs and/or network processors), and physical network interfaces (NIs) 316 (through which network connections are made, such as those shown by the connectivity between NDs 300A-H), as well as non-transitory machine readable storage media 318 having stored therein networking software 320. During operation, the networking software 320 may be executed by the networking hardware 310 to instantiate a set of one or more networking software instance(s) 322. Each of the networking software instance(s) 322, and that part of the networking hardware 310 that executes that network software instance (be it hardware dedicated to that networking software instance and/or time slices of hardware temporally shared by that networking software instance with others of the networking software instance(s) 322), form a separate virtual network element 330A-R. Each of the virtual network element(s) (VNEs) 330A-R includes a control communication and configuration module 332A-R (sometimes referred to as a local control module or control communication module) and forwarding table(s) 334A-R, such that a given virtual network element (e.g., 330A) includes the control communication and configuration module (e.g., 332A), a set of one or more forwarding table(s) (e.g., 334A), and that portion of the networking hardware 310 that executes the virtual network element (e.g., 330A).

Networking software instances 322 can support the execution of applications 364A-R such as a packet processing system having a non-busy looping mode. The applications 364A-R can be implemented as part of control communication and configuration 332A-R, or similar components of the special-purpose network device 302. The packet processing system 364A-R can be stored with networking software 320 in the non-transitory machine-readable storage media 318. The packet processing system 364A-R with non-busy looping mode operates as described herein above.

The special-purpose network device 302 is often physically and/or logically considered to include: 1) a ND control plane 324 (sometimes referred to as a control plane) comprising the processor(s) 312 that execute the control communication and configuration module(s) 332A-R; and 2) a ND forwarding plane 326 (sometimes referred to as a forwarding plane, a data plane, or a media plane) comprising the forwarding resource(s) 314 that utilize the forwarding table(s) 334A-R and the physical NIs 316. By way of example, where the ND is a router (or is implementing routing functionality), the ND control plane 324 (the processor(s) 312 executing the control communication and configuration module(s) 332A-R) is typically responsible for participating in controlling how data (e.g., packets) is to be routed (e.g., the next hop for the data and the outgoing physical NI for that data) and storing that routing information in the forwarding table(s) 334A-R, and the ND forwarding plane 326 is responsible for receiving that data on the physical NIs 316 and forwarding that data out the appropriate ones of the physical NIs 316 based on the forwarding table(s) 334A-R.

FIG. 3B illustrates an exemplary way to implement the special-purpose network device 302 according to some embodiments of the invention. FIG. 3B shows a special-purpose network device including cards 338 (typically hot pluggable). While in some embodiments the cards 338 are of two types (one or more that operate as the ND forwarding plane 326 (sometimes called line cards), and one or more that operate to implement the ND control plane 324 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 336 (e.g., a first full mesh coupling the line cards and a second full mesh coupling all of the cards).

Returning to FIG. 3A, the general-purpose network device 304 includes hardware 340 comprising a set of one or more processor(s) 342 (which are often COTS processors) and physical NIs 346, as well as non-transitory machine readable storage media 348 having stored therein software 350. During operation, the processor(s) 342 execute the software 350 to instantiate one or more sets of one or more applications 364A-R. While one embodiment does not implement virtualization, alternative embodiments may use different forms of virtualization. For example, in one such alternative embodiment the virtualization layer 354 represents the kernel of an operating system (or a shim executing on a base operating system) that allows for the creation of multiple instances 362A-R called software containers that may each be used to execute one (or more) of the sets of applications 364A-R; where the multiple software containers (also called virtualization engines, virtual private servers, or jails) are user spaces (typically a virtual memory space) that are separate from each other and separate from the kernel space in which the operating system is run: and where the set of applications running in a given user space, unless explicitly allowed, cannot access the memory of the other processes. In another such alternative embodiment the virtualization layer 354 represents a hypervisor (sometimes referred to as a virtual machine monitor (WM)) or a hypervisor executing on top of a host operating system, and each of the sets of applications 364A-R is run on top of a guest operating system within an instance 362A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 340, directly on a hypervisor (in which case the unikernel is sometimes described as running within a LibOS virtual machine), or in a software container, embodiments can be implemented fully with unikernels running directly on a hypervisor represented by virtualization layer 354, unikernels running within software containers represented by instances 362A-R, or as a combination of unikernels and the above-described techniques (e.g., unikernels and virtual machines both run directly on a hypervisor, unikernels and sets of applications that are run in different software containers).

The instantiation of the one or more sets of one or more applications 364A-R, as well as virtualization if implemented, are collectively referred to as software instance(s) 352. Each set of applications 364A-R, corresponding virtualization construct (e.g., instance 362A-R) if implemented, and that part of the hardware 340 that executes them (be it hardware dedicated to that execution and/or time slices of hardware temporally shared), forms a separate virtual network element(s) 360A-R.

Networking software instances 352 can support the execution of applications 364A-R such as a packet processing system having a non-busy looping mode. The applications 364A-R can be implemented as part of containers 362A-R, or similar components of the general-purpose network device 304. The packet processing system 364A-R can be stored with networking software 350 in the non-transitory machine readable storage media 348. The packet processing system 364A-R with non-busy looping mode operates as described herein above.

The virtual network element(s) 360A-R perform similar functionality to the virtual network element(s) 330A-R—e.g., similar to the control communication and configuration module(s) 332A and forwarding table(s) 334A (this virtualization of the hardware 340 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 362A-R corresponding to one VNE 360A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 362A-R to VNEs also apply to embodiments where such a finer level of granularity and/or unikernels are used.

In certain embodiments, the virtualization layer 354 includes a virtual switch that provides similar forwarding services as a physical Ethernet switch. Specifically, this virtual switch forwards traffic between instances 362A-R and the physical NI(s) 346, as well as optionally between the instances 362A-R; in addition, this virtual switch may enforce network isolation between the VNEs 360A-R that by policy are not permitted to communicate with each other (e.g., by honoring virtual local area networks (VLANs)).

The third exemplary ND implementation in FIG. 3A is a hybrid network device 306, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 302) could provide for para-virtualization to the networking hardware present in the hybrid network device 306.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 330A-R, VNEs 360A-R, and those in the hybrid network device 306) receives data on the physical NIs (e.g., 316, 346) and forwards that data out the appropriate ones of the physical NIs (e.g., 316, 346). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 3C:
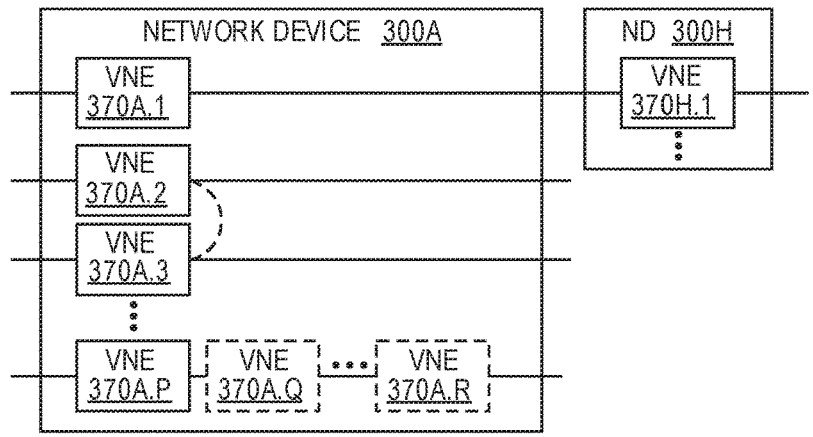
FIG. 3C illustrates various exemplary ways in which virtual network elements (VNEs) may be coupled according to some embodiments of the invention.

FIG. 3C illustrates various exemplary ways in which VNEs may be coupled according to some embodiments of the invention. FIG. 3C shows VNEs 370A.1-370A.P (and optionally VNEs 370A.Q-370A.R) implemented in ND 300A and VNE 370H.1 in ND 300H. In FIG. 3C, VNEs 370A.1-P are separate from each other in the sense that they can receive packets from outside ND 300A and forward packets outside of ND 300A; VNE 370A.1 is coupled with VNE 370H.1, and thus they communicate packets between their respective NDs; VNE 370A.2-370A.3 may optionally forward packets between themselves without forwarding them outside of the ND 300A; and VNE 370A.P may optionally be the first in a chain of VNEs that includes VNE 370A.Q followed by VNE 370A.R (this is sometimes referred to as dynamic service chaining, where each of the VNEs in the series of VNEs provides a different service—e.g., one or more layer 4-7 network services). While FIG. 3C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 3A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 3A may also host one or more such servers (e.g., in the case of the general purpose network device 304, one or more of the software instances 362A-R may operate as servers; the same would be true for the hybrid network device 306; in the case of the special-purpose network device 302, one or more such servers could also be run on a virtualization layer executed by the processor(s) 312); in which case the servers are said to be co-located with the VNEs of that ND.

A virtual network is a logical abstraction of a physical network (such as that in FIG. 3A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 3D:
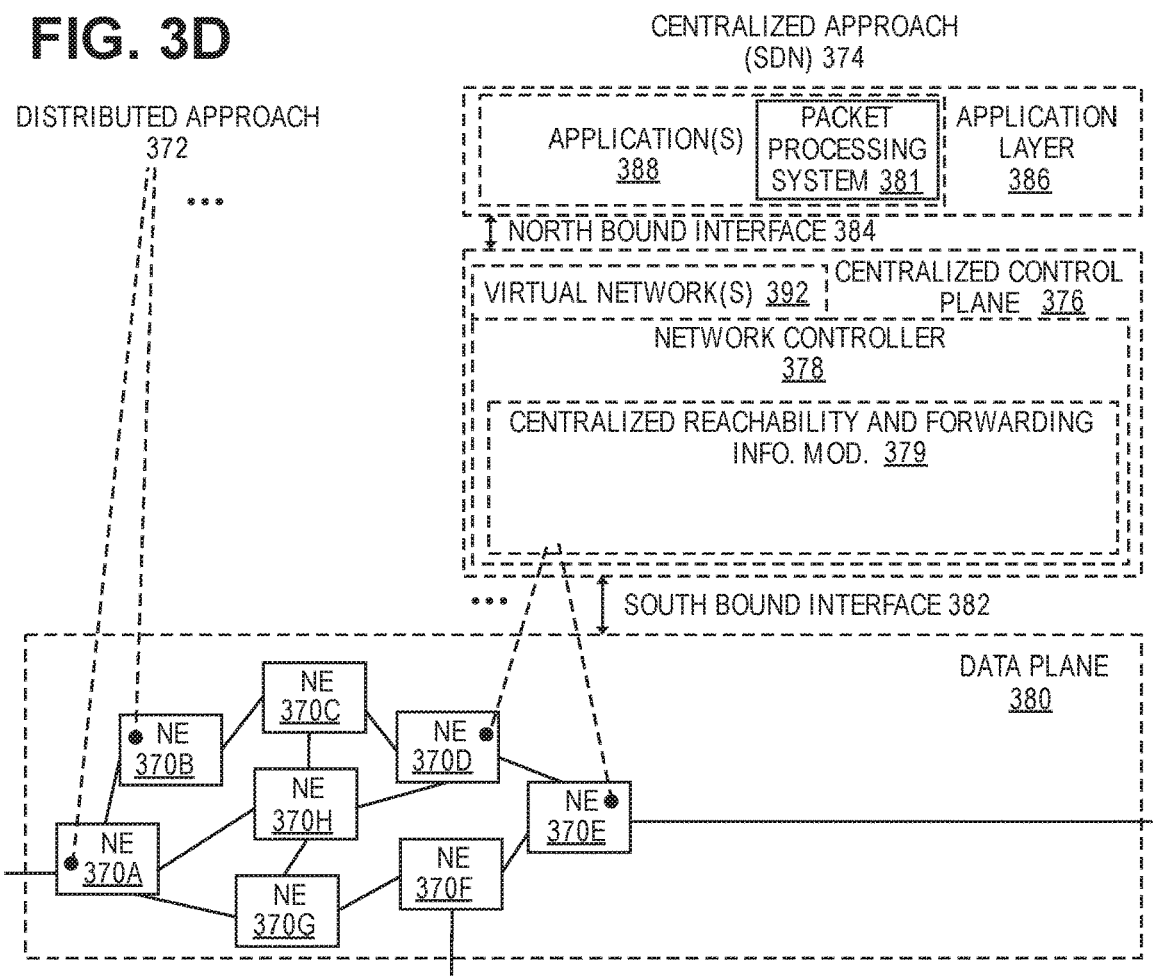
FIG. 3D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 3D illustrates a network with a single network element on each of the NDs of FIG. 3A, and within this straight forward approach contrasts a traditional distributed approach (commonly used by traditional routers) with a centralized approach for maintaining reachability and forwarding information (also called network control), according to some embodiments of the invention. Specifically, FIG. 3D illustrates network elements (NEs) 370A-H with the same connectivity as the NDs 300A-H of FIG. 3A.

FIG. 3D illustrates that the distributed approach 372 distributes responsibility for generating the reachability and forwarding information across the NEs 370A-H; in other words, the process of neighbor discovery and topology discovery is distributed.

For example, where the special-purpose network device 302 is used, the control communication and configuration module(s) 332A-R of the ND control plane 324 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 370A-H (e.g., the processor(s) 312 executing the control communication and configuration module(s) 332A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 324. The ND control plane 324 programs the ND forwarding plane 326 with information (e.g., adjacency and route information) based on the routing structure(s). For example, the ND control plane 324 programs the adjacency and route information into one or more forwarding table(s) 334A-R (e.g., Forwarding Information Base (FIB), Label Forwarding Information Base (LFIB), and one or more adjacency structures) on the ND forwarding plane 326. For layer 2 forwarding, the ND can store one or more bridging tables that are used to forward data based on the layer 2 information in that data. While the above example uses the special-purpose network device 302, the same distributed approach 372 can be implemented on the general-purpose network device 304 and the hybrid network device 306.

FIG. 3D illustrates that a centralized approach 374 (also known as software defined networking (SDN)) that decouples the system that makes decisions about where traffic is sent from the underlying systems that forwards traffic to the selected destination. The illustrated centralized approach 374 has the responsibility for the generation of reachability and forwarding information in a centralized control plane 376 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 376 has a south bound interface 382 with a data plane 380 (sometime referred to the infrastructure layer, network forwarding plane, or forwarding plane (which should not be confused with a ND forwarding plane)) that includes the NEs 370A-H (sometimes referred to as switches, forwarding elements, data plane elements, or nodes). The centralized control plane 376 includes a network controller 378, which includes a centralized reachability and forwarding information module 379 that determines the reachability within the network and distributes the forwarding information to the NEs 370A-H of the data plane 380 over the south bound interface 382 (which may use the OpenFlow protocol). Thus, the network intelligence is centralized in the centralized control plane 376 executing on electronic devices that are typically separate from the NDs.

For example, where the special-purpose network device 302 is used in the data plane 380, each of the control communication and configuration module(s) 332A-R of the ND control plane 324 typically include a control agent that provides the VNE side of the south bound interface 382. In this case, the ND control plane 324 (the processor(s) 312 executing the control communication and configuration module(s) 332A-R) performs its responsibility for participating in controlling how data (e.g., packets) is to be routed (e.g., the next hop for the data and the outgoing physical NI for that data) through the control agent communicating with the centralized control plane 376 to receive the forwarding information (and in some cases, the reachability information) from the centralized reachability and forwarding information module 379 (it should be understood that in some embodiments of the invention, the control communication and configuration module(s) 332A-R, in addition to communicating with the centralized control plane 376, may also play some role in determining reachability and/or calculating forwarding information—albeit less so than in the case of a distributed approach; such embodiments are generally considered to fall under the centralized approach 374, but may also be considered a hybrid approach).

While the above example uses the special-purpose network device 302, the same centralized approach 374 can be implemented with the general purpose network device 304 (e.g., each of the VNE 360A-R performs its responsibility for controlling how data (e.g., packets) is to be routed (e.g., the next hop for the data and the outgoing physical NI for that data) by communicating with the centralized control plane 376 to receive the forwarding information (and in some cases, the reachability information) from the centralized reachability and forwarding information module 379; it should be understood that in some embodiments of the invention, the VNEs 360A-R, in addition to communicating with the centralized control plane 376, may also play some role in determining reachability and/or calculating forwarding information—albeit less so than in the case of a distributed approach) and the hybrid network device 306. In fact, the use of SDN techniques can enhance the NFV techniques typically used in the general purpose network device 304 or hybrid network device 306 implementations as NFV is able to support SDN by providing an infrastructure upon which the SDN software can be run, and NFV and SDN both aim to make use of commodity server hardware and physical switches.

FIG. 3D also shows that the centralized control plane 376 has a north bound interface 384 to an application layer 386, in which resides application(s) 388. The centralized control plane 376 has the ability to form virtual networks 392 (sometimes referred to as a logical forwarding plane, network services, or overlay networks (with the NEs 370A-H of the data plane 380 being the underlay network)) for the application(s) 388. Thus, the centralized control plane 376 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

The application layer 386 can support the execution of applications 388 such as a packet processing system having a non-busy looping mode. The applications 388 can be implemented as part of a central controller for a centralized approach 374, or similar components of the centralized approach 374. The packet processing system 388 can be stored with networking software in the non-transitory machine-readable storage media. The packet processing system 388 with non-busy looping mode operates as described herein above.

While FIG. 3D shows the distributed approach 372 separate from the centralized approach 374, the effort of network control may be distributed differently or the two combined in certain embodiments of the invention. For example: 1) embodiments may generally use the centralized approach (SDN) 374, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 374, but may also be considered a hybrid approach.

While FIG. 3D illustrates the simple case where each of the NDs 300A-H implements a single NE 370A-H, it should be understood that the network control approaches described with reference to FIG. 3D also work for networks where one or more of the NDs 300A-H implement multiple VNEs (e.g., VNEs 330A-R, VNEs 360A-R, those in the hybrid network device 306). Alternatively or in addition, the network controller 378 may also emulate the implementation of multiple VNEs in a single ND. Specifically, instead of (or in addition to) implementing multiple VNEs in a single ND, the network controller 378 may present the implementation of a VNE/NE in a single ND as multiple VNEs in the virtual networks 392 (all in the same one of the virtual network(s) 392, each in different ones of the virtual network(s) 392, or some combination). For example, the network controller 378 may cause an ND to implement a single VNE (a NE) in the underlay network, and then logically divide up the resources of that NE within the centralized control plane 376 to present different VNEs in the virtual network(s) 392 (where these different VNEs in the overlay networks are sharing the resources of the single VNE/NE implementation on the ND in the underlay network).

Figure 3E:
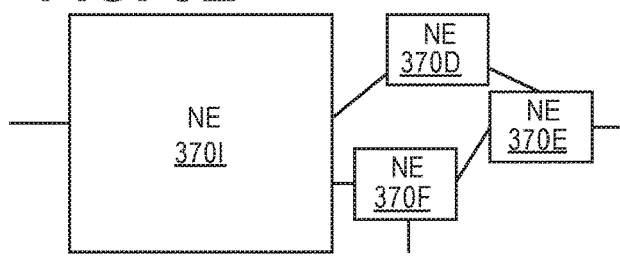
FIG. 3E illustrates the simple case of where each of the NDs implements a single NE, but a centralized control plane has abstracted multiple of the NEs in different NDs into (to represent) a single NE in one of the virtual network(s), according to some embodiments of the invention.
Figure 3F:
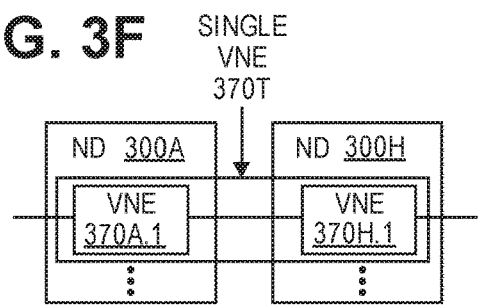
FIG. 3F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 3E and 3F respectively illustrate exemplary abstractions of NEs and VNEs that the network controller 378 may present as part of different ones of the virtual networks 392. FIG. 3E illustrates the simple case of where each of the NDs 300A-H implements a single NE 370A-H (see FIG. 3D), but the centralized control plane 376 has abstracted multiple of the NEs in different NDs (the NEs 370A-C and G-H) into (to represent) a single NE 3701 in one of the virtual network(s) 392 of FIG. 3D, according to some embodiments of the invention. FIG. 3E shows that in this virtual network, the NE 3701 is coupled to NE 370D and 370F, which are both still coupled to NE 370E.

FIG. 3F illustrates a case where multiple VNEs (VNE 370A.1 and VNE 370H.1) are implemented on different NDs (ND 300A and ND 300H) and are coupled to each other, and where the centralized control plane 376 has abstracted these multiple VNEs such that they appear as a single VNE 370T within one of the virtual networks 392 of FIG. 3D, according to some embodiments of the invention. Thus, the abstraction of a NE or VNE can span multiple NDs.

While some embodiments of the invention implement the centralized control plane 376 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 376, and thus the network controller 378 including the centralized reachability and forwarding information module 379, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 4 illustrates, a general-purpose control plane device 404 including hardware 440 comprising a set of one or more processor(s) 442 (which are often COTS processors) and physical NIs 446, as well as non-transitory machine readable storage media 448 having stored therein centralized control plane (CCP) software 450.

In embodiments that use compute virtualization, the processor(s) 442 typically execute software to instantiate a virtualization layer 454 (e.g., in one embodiment the virtualization layer 454 represents the kernel of an operating system (or a shim executing on a base operating system) that allows for the creation of multiple instances 462A-R called software containers (representing separate user spaces and also called virtualization engines, virtual private servers, or jails) that may each be used to execute a set of one or more applications; in another embodiment the virtualization layer 454 represents a hypervisor (sometimes referred to as a virtual machine monitor (VMM)) or a hypervisor executing on top of a host operating system, and an application is run on top of a guest operating system within an instance 462A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 440, directly on a hypervisor represented by virtualization layer 454 (in which case the unikernel is sometimes described as running within a LibOS virtual machine), or in a software container represented by one of instances 462A-R). Again, in embodiments where compute virtualization is used, during operation an instance of the CCP software 450 (illustrated as CCP instance 476A) is executed (e.g., within the instance 462A) on the virtualization layer 454. In embodiments where compute virtualization is not used, the CCP instance 476A is executed, as a unikernel or on top of a host operating system, on the "bare metal" general purpose control plane device 404. The instantiation of the CCP instance 476A, as well as the virtualization layer 454 and instances 462A-R if implemented, are collectively referred to as software instance(s) 452.

In some embodiments, the CCP instance 476A includes a network controller instance 478. The network controller instance 478 includes a centralized reachability and forwarding information module instance 479 (which is a middleware layer providing the context of the network controller 378 to the operating system and communicating with the various NEs), and an CCP application layer 480 (sometimes referred to as an application layer) over the middleware layer (providing the intelligence required for various network operations such as protocols, network situational awareness, and user-interfaces). At a more abstract level, this CCP application layer 480 within the centralized control plane 376 works with virtual network view(s) (logical view(s) of the network) and the middleware layer provides the conversion from the virtual networks to the physical view.

The centralized control plane 376 transmits relevant messages to the data plane 380 based on CCP application layer 480 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 380 may receive different messages, and thus different forwarding information. The data plane 380 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

The CCO application layer 480 can support the execution of applications such as a packet processing system 488 having a non-busy looping mode. The applications 488 can be implemented as part of a central controller 404 for a centralized approach, in a cloud computing environment or similar components and scenarios. The packet processing system 488 can be stored with software in the non-transitory machine-readable storage media. The packet processing system 488 with non-busy looping mode operates as described herein above.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 380, the packet (or a subset of the packet header and content) is typically forwarded to the centralized control plane 376. The centralized control plane 376 will then program forwarding table entries into the data plane 380 to accommodate packets belonging to the flow of the unknown packet. Once a specific forwarding table entry has been programmed into the data plane 380 by the centralized control plane 376, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

FIG. 5 is a diagram of one example embodiment of non-busy looping mode packet processing system in a cloud computing environment. In this example embodiment, a set of specialize or general-purpose computing or network devices share resources and provide a cloud computing environment 500. Any number of devices and components can be coordinated to provide the cloud computing environment. Process and functions can be distributed across these devices to enable customers of the cloud computing environment to run applications 501 using the resources of the cloud computing environment 500.

The cloud computing environment 500 uses an operating system or set of operating system to manager resources in the cloud computing environment and to provision these resources to customers. The cloud computing environment also includes a set of administrative components to monitor resource usage of the customers. The administrative components can include resource usage monitors 507 and a charge manager 509. The resource usage monitors 507 track resource usage, e.g., CPU usage, energy usage, memory usage, and similar cloud computing environment resources by customers or customer applications 501. The charge manager 509 determines billing to customers based on the metrics generated for resource usage by customers and/or customer applications 501 tracked by the resource usage monitor 507. In this environment, making the operation of customer applications 501 efficient has significant effects on costs for customers.

A cloud computing environment 500 can be connected to any type of network 511 including the Internet. The cloud computing environment 500 can be connected to any number and variety of computing devices including network devices 513A-D. In the illustrated example, a cloud computing environment 500 is executing a virtual router 503 including a packet processing system 505 as a virtual set of functions for network devices 513A-D. The virtual router 503 can be any type of virtual router or similar software that utilizes a packet processing system 505. The packet processing system 505 can implement the non-busy looping mode as described herein. The cloud computing environment can support any number of customers executing any number of customer applications 501 including any number implementing one or more packet processing systems 505. The packet processing system 505 with non-busy looping is scalable in a cloud computing environment 500 to enable any number of packet processing systems 505 to benefit from reduced resource usage (as monitored by the resource usage monitor 507) and thereby reduced charges (as calculated by the charging manager 509).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a computing system for managing resources to decrease busy-looping, the method using a sliding window template including at least a first sliding window, the first sliding window to store a plurality of status values for a monitored resource, the method comprising:
initializing the sliding window template for the monitored resource;
determining a current status of the monitored resource;
updating the first sliding window to store the current status as one of the plurality of status values;
determining a first sliding window status based on whether the plurality of status values generate a score that exceeds a first sliding window threshold;

updating a second sliding window to store the first sliding window status as a status value of the second sliding window; and determining whether to sleep the monitored resource based on a decision-making table that uses at least the first sliding window status and a second sliding window status as input.

2. The method of claim 1, further comprising:
sleeping the resource for a pre-determined time where the input maps to a sleep value in the decision-making table.

3. The method of claim 1, further comprising:
determining the second sliding window status based on whether a plurality of status values in the second sliding window generate a score that exceeds a second sliding window threshold.

4. The method of claim 1, further comprising:
shifting values in the first sliding window after updating the first sliding window with the current status.

5. The method of claim 1, wherein the monitored resource is a thread for packet processing, a set of threads for multi-queue packet processing, or a set of micro-tasks to be scheduled for processing.

6. A network device to execute a method for manage resources usage to decrease busy-looping, the method using a sliding window template including at least a first sliding window, the first sliding window to store a plurality of status values for a monitored resource, the network device comprising:
a non-transitory machine-readable medium having stored therein a packet processing system with a non-busy looping mode; and
a processor coupled to the non-transitory machine-readable medium, the processor to execute the packet processing system, the packet processing system to initialize the sliding window template for the monitored resource, to determine a current status of the monitored resource, to update the first sliding window to store the current status as one of the plurality of status values, to determine a first sliding window status based on whether the plurality of status values generate a score that exceeds a first sliding window threshold, to update a second sliding window to store the first sliding window status as a status value of the second sliding window, and to determine whether to sleep the monitored resource based on a decision-making table that uses at least the first sliding window status and a second sliding window status as input.

7. The network device of claim 6, wherein the packet processing system is further to sleep the resource for a pre-determined time where the input maps to a sleep value in the decision-making table.

8. The network device of claim 6, wherein the packet processing system is further to determine the second sliding window status based on whether a plurality of status values in the second sliding window generate a score that exceeds a second sliding window threshold.

9. The network device of claim 6, wherein the packet processing system is further to shift values in the first sliding window after updating the first sliding window with the current status.

10. The network device of claim 6, wherein the monitored resource is a thread for packet processing, a set of threads for multi-queue packet processing, or a set of micro-tasks to be scheduled for processing.

11. A computing device implementing a plurality of virtual machines for implementing network function virtualization (NFV), wherein a virtual machine from the plurality of virtual machines is configured to execute a method to manage resources usage to decrease busy-looping, the method using a sliding window template including at least a first sliding window, the first sliding window to store a plurality of status values for a monitored resource, the computing device comprising:
a non-transitory machine-readable medium having stored therein a packet processing system with a non-busy looping mode; and
a processor coupled to the non-transitory machine-readable medium, the processor to execute the virtual machine, the virtual machine to execute the packet processing system, the packet processing system to initialize the sliding window template for the monitored resource, to determine a current status of the monitored resource, to update the first sliding window to store the current status as one of the plurality of status values, to determine a first sliding window status based on whether the plurality of status values generate a score that exceeds a first sliding window threshold, to update a second sliding window to store the first sliding window status as a status value of the second sliding window, and to determine whether to sleep the monitored resource based on a decision-making table that uses at least the first sliding window status and a second sliding window status as input.

12. The computing device of claim 11, wherein the packet processing system is further to sleep the resource for a pre-determined time where the input maps to a sleep value in the decision-making table.

13. The computing device of claim 11, wherein the packet processing system is further to determine the second sliding window status based on whether a plurality of status values in the second sliding window generate a score that exceeds a second sliding window threshold.

14. The computing device of claim 11, wherein the packet processing system is further to shift values in the first sliding window after updating the first sliding window with the current status.

15. The computing device of claim 11, wherein the monitored resource is a thread for packet processing, a set of threads for multi-queue packet processing, or a set of micro-tasks to be scheduled for processing.

16. A non-transitory machine-readable medium having stored therein a set of instructions, which when executed by a computing device cause the computing device to perform set of operation of a method to manage resources to decrease busy-looping, the method using a sliding window template including at least a first sliding window, the first sliding window to store a plurality of status values for a monitored resource, the set of operations comprising:
initializing the sliding window template for the monitored resource;
determining a current status of the monitored resource;
updating the first sliding window to store the current status as one of the plurality of status values;
determining a first sliding window status based on whether the plurality of status values generate a score that exceeds a first sliding window threshold;
updating a second sliding window to store the first sliding window status as a status value of the second sliding window; and
determining whether to sleep the monitored resource based on a decision-making table that uses at least the first sliding window status and a second sliding window status as input.

17. The non-transitory machine-readable medium of claim 16, wherein the operations are further comprising:
sleeping the resource for a pre-determined time where the input maps to a sleep value in the decision-making table.

18. The non-transitory machine-readable medium of claim 16, wherein the operations are further comprising:
determining the second sliding window status based on whether a plurality of status values in the second sliding window generate a score that exceeds a second sliding window threshold.

19. The non-transitory machine-readable medium of claim 16, wherein the operations are further comprising:
shifting values in the first sliding window after updating the first sliding window with the current status.

20. The non-transitory machine-readable medium of claim 16, wherein the monitored resource is a thread for packet processing, a set of threads for multi-queue packet processing, or a set of micro-tasks to be scheduled for processing.

* * * * *